(12) United States Patent
Telford et al.

(10) Patent No.: US 7,036,618 B2
(45) Date of Patent: May 2, 2006

(54) HOOD ASSEMBLY

(75) Inventors: David C. Telford, Appleton, MN (US); Keith M. Ricke, Willmar, MN (US); Rex L. Ruppert, Benson, MN (US)

(73) Assignee: CNH America LLC, Racine, WI (US)

( * ) Notice: Subject to any disclaimer, the term of this patent is extended or adjusted under 35 U.S.C. 154(b) by 174 days.

(21) Appl. No.: 10/882,896

(22) Filed: Jul. 1, 2004

(65) Prior Publication Data

US 2006/0000653 A1    Jan. 5, 2006

(51) Int. Cl.
*B62D 25/10* (2006.01)

(52) U.S. Cl. ............... 180/69.2; 180/69.21; 180/89.17

(58) Field of Classification Search ............... 180/69.2, 180/69.21, 69.23, 89.12, 89.17; 296/193.11
See application file for complete search history.

(56) References Cited

U.S. PATENT DOCUMENTS

| | | | | |
|---|---|---|---|---|
| 2,737,254 | A * | 3/1956 | Bayley ................... | 180/69.21 |
| 3,419,099 | A | 12/1968 | Brumbaugh et al. | |
| 4,359,119 | A | 11/1982 | Kammerman | |
| 5,435,406 | A * | 7/1995 | Gaffoglio et al. ........ | 180/69.21 |
| 5,538,097 | A * | 7/1996 | Stauffer et al. .......... | 180/69.21 |
| 5,564,514 | A * | 10/1996 | Knight .................... | 180/69.21 |
| 5,730,240 | A | 3/1998 | Hoffman et al. | |
| 5,749,425 | A | 5/1998 | Cudden | |
| 5,791,428 | A | 8/1998 | Noll et al. | |
| 5,890,556 | A | 4/1999 | Shearn et al. | |
| 5,975,228 | A | 11/1999 | Parfitt | |
| 6,213,235 | B1 | 4/2001 | Elhardt et al. | |
| 6,394,211 | B1 | 5/2002 | Palenchar et al. | |
| 6,454,035 | B1 | 9/2002 | Waskow et al. | |
| 6,460,916 | B1 | 10/2002 | Mizuta | |
| 6,517,111 | B1 | 2/2003 | Mizuta | |
| 6,637,531 | B1 | 10/2003 | Palenchar et al. | |
| 6,910,545 | B1 * | 6/2005 | Haun ....................... | 180/69.2 |
| 6,929,279 | B1 * | 8/2005 | Boden ..................... | 280/477 |
| 2001/0004950 | A1 | 6/2001 | Mizuta | |
| 2002/0166707 | A1 | 11/2002 | Palenchar et al. | |

OTHER PUBLICATIONS

Case IH, Sales Brochure, FLX 3000 Series Floaters, 2000, All Pages.
Case IH, CAD Drawing, FLX 3300 B linkage.
Case IH, Screen Print (computer), 2090 hood and parts list, Mar. 2004.

(Continued)

*Primary Examiner*—Christopher P. Ellis
*Assistant Examiner*—Brian Swenson
(74) *Attorney, Agent, or Firm*—Rebecca Henkel

(57) ABSTRACT

A three-wheeled agricultural applicator includes a hood assembly with enhanced maneuverability between an open and a closed position. The hood assembly includes a hood and a linkage assembly coupling the hood to a frame assembly of the agricultural applicator. The linkage assembly includes a first pivotal hood coupling assembly, a second pivotal hood coupling assembly, and a third pivotal hood coupling assembly located therebetween, attached to the hood. The linkage assembly further includes a first assist device and a second assist device each attached between the hood and frame assembly. The first and second assist devices are each configured to exert a force to assist the operator in moving the hood from the closed position toward an open position.

20 Claims, 6 Drawing Sheets

OTHER PUBLICATIONS

Case IH, CAD Drawing, 7110 hood and parts list.
Case IH, CAD Drawing, 7210 hood and parts list.
Case IH, CAD Drawing, 8910 hood and parts list.
Case IH, CAD Drawing, 2094-3594 hood and parts list.
Case IH, CAD Drawing, 2590 hood and parts list.
Case IH, CAD Drawing, 2090 hood and parts list.
Case IH, CAD Drawing, 4494 hood and parts list.
Case IH, CAD Drawing, 4490 hood and parts list, 1982.

* cited by examiner

HOOD ASSEMBLY

FIELD OF INVENTION

The invention relates to an agricultural applicator and, more particularly, to a hood assembly that enhances readiness and ease in accessing a drive unit of a three-wheeled agricultural applicator.

BACKGROUND OF INVENTION

Numerous types of agricultural applicators are available today. These can include a pull-type unit or a self-propelled unit. A certain known agricultural applicator is also referred to a "floater." The floater is a large vehicle that uses large, oversized floatation tires to carry the vehicle across firm to muddy agricultural environments. One particular floatation chassis assembly includes a pair of rear floatation tires and a front floatation tire. The chassis assembly is configured to support one or more bulk storage tanks or bins of product for application in an agricultural environment usually before planting in the spring or after harvest in the fall. The types of agricultural products e.g., fertilizer, herbicide, pesticide, nutrients, etc. can vary. The floater can also be utilized to tow various agricultural implements. The oversize-tired agricultural applicators are generally desired for their ability to maneuver heavy, loads over extremely rough and difficult agricultural terrain with little soil compaction.

However, these floater-type agricultural applicators have drawbacks. Typical three-wheeled agricultural applicators include hood assemblies that are heavy and cumbersome for one operator to maneuver. Certain known hood assemblies are provided with lift mechanisms to assist opening the hood assembly. However, known hood assemblies do not lift the hood high enough to provide adequate access to service the drive unit. Furthermore, known hood assemblies do not rotate or tilt the hood far enough forward to clear the cab or the oversized floatation tires used on the floater-type agricultural applicators.

Thus, there is a need for a hood assembly for an agricultural applicator (e.g., floater) that provides enhanced ease for an operator to maneuver the hood assembly to access the drive unit. There is also a need for a hood assembly with a lift mechanism that is stable and that provides adequate lift assistance to allow a single operator to raise the hood. There is yet a further need for a lift mechanism that lifts the hood high enough and forward enough to clear the cab, the fork assembly and the oversized floatation tires associated with the three-wheeled floater.

SUMMARY OF THE INVENTION

The present invention provides a hood linkage assembly for the hood of a vehicle. The vehicle generally includes a frame assembly having a forward end relative to a forward direction of travel of the vehicle. The frame assembly is in support of a cab and a drive unit mounted between the cab and the forward end of the frame. In a closed position, the hood is generally located between the cab and the forward end of the frame of the vehicle and above the drive unit. In an open position, the hood is generally vertically aligned or extended and located adjacent to the forward end of the vehicle frame.

The hood generally includes a first sidewall, a second sidewall opposite the first sidewall, and an upper portion extending therebetween. The upper portion of the hood includes a forward end and a rearward end relative to the forward direction of travel of the vehicle. The linkage assembly in accordance with the invention couples the hood to the vehicle frame assembly. The linkage assembly includes a first pivotal hood coupling assembly, a second pivotal hood coupling assembly, and a third pivotal hood coupling assembly. The first pivotal hood coupling assembly is attached at a forward end of the first hood sidewall. The second pivotal hood coupling assembly is attached at a forward end of the second hood sidewall. The third pivotal hood coupling assembly is attached at the forward end of the upper portion of the hood, and located centrally between the first and the second pivotal hood coupling assemblies. A cross bar interconnects the third pivotal coupling assembly with the first and second pivotal coupling assemblies. The linkage assembly further includes a first assist device and a second assist device. The first assist device is connected between the frame and the first hood sidewall. The second assist device is connected between the frame and the second hood sidewall. The first and second assist devices are each configured to exert a force to assist the operator in moving the hood from the closed position toward an open position.

The present invention also provides a hood assembly for a drive unit of an agricultural applicator. The agricultural applicator includes a frame assembly in support of a cab and a drive unit on a series of wheel assemblies. The frame assembly includes a forward end relative to a forward direction of travel of the agricultural applicator. The drive unit is located between the cab and the forward end of the frame assembly. The hood assembly includes a hood and a hood linkage assembly coupling the hood to the frame assembly of the agricultural applicator. In a closed position, the hood is located between the cab and the forward end of the vehicle frame assembly and above the drive unit. In an open position, the hood is generally vertically aligned and located forward of the forward end of the vehicle frame assembly. The hood generally includes a first hood sidewall, a second hood sidewall opposite the first hood sidewall, and an upper portion extending therebetween. The upper portion of the hood includes a forward end and a rearward end relative to the forward direction of travel of the vehicle.

The linkage assembly generally includes a first assist device and a second assist device. The first assist device is connected between the frame assembly and the first hood sidewall. The second assist device is connected between the frame assembly and the second hood sidewall. The first and second assist devices each are configured to exert a force to assist the operator in moving the hood from the closed position toward an open position. The linkage assembly further includes a first pivotal coupling assembly, a second pivotal coupling assembly, and a third pivotal coupling assembly centrally located therebetween. The first pivotal coupling assembly is attached to the first hood sidewall. The second pivotal coupling assembly is attached to the second hood sidewall. A third pivotal coupling assembly is attached at the forward end of the upper portion of the hood. The linkage assembly further includes a cross bar interconnecting the third rotatable coupling assembly with the first and second rotatable coupling assemblies.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

A wide variety of vehicles could be constructed in accordance with the invention defined by the claims. Hence, while preferred embodiments of a hood assembly in accordance with the invention will now be generally described with reference to a three-wheeled agricultural applicator, it should be understood that the invention is in no way so limited. The hood assembly can be configured for any type of vehicle.

Figure 1:
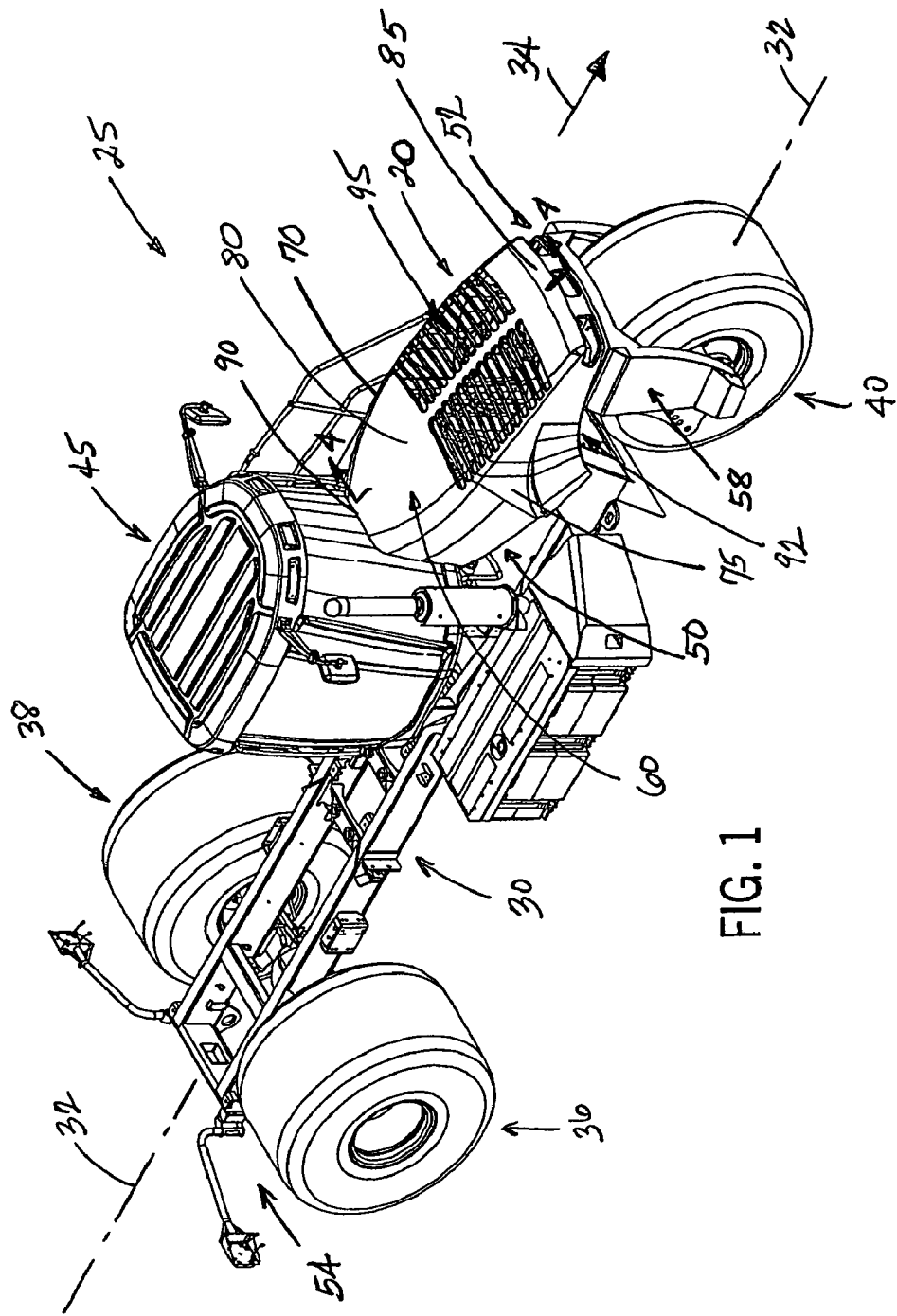
FIG. 1 illustrates an isometric view of an agricultural applicator employing a hood assembly in accordance with the present invention.

FIG. 1 illustrates a hood assembly 20 in accordance with the present invention mounted on an agricultural applicator. A preferred agricultural applicator is a three-wheeled agricultural machine herein referred to as a "floater" 25. The floater 25 generally includes a frame assembly 30 having a central longitudinal axis 32 extending in a forward direction of travel (shown as arrow 34) of the floater 25. The frame assembly 30 is preferably mounted on a first rear wheel assembly 36, a second rear wheel assembly 38, and a single front wheel assembly 40. However, although a three-wheeled agricultural applicator is shown, it is understood that the number of wheel assemblies can vary and is not limiting on the invention. A cab 45 and a drive unit 50 (see FIG. 2) are supported on the frame assembly 30. Yet, the frame assembly 30 can support various other items (e.g., sprayer assembly, bulk storage tank, etc.) not shown. The frame assembly 30 generally has a forward end 52 and a rearward end 54 relative to the forward direction of travel 34.

Figure 4:
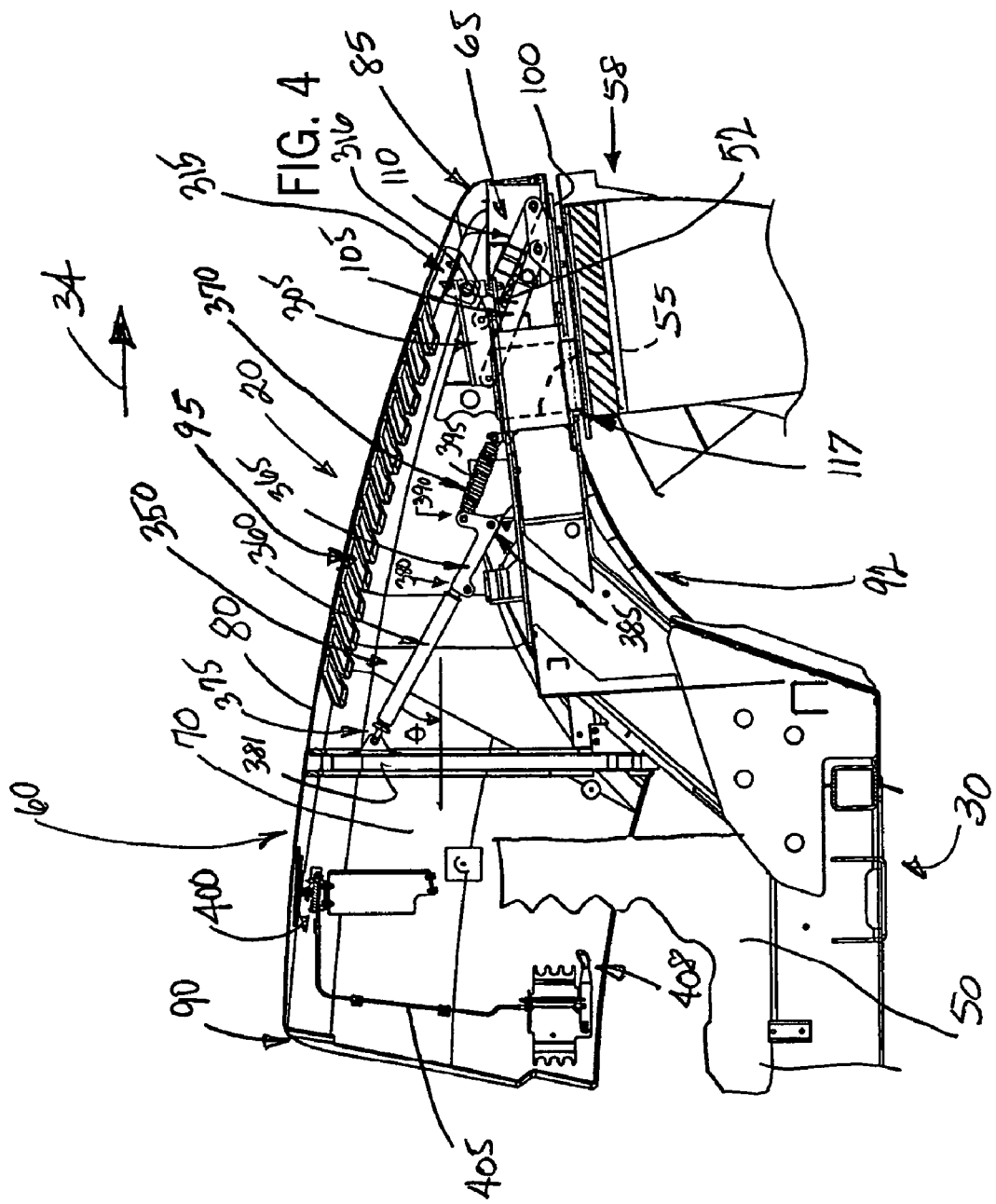
FIG. 4 illustrates a detailed cross-section along line 4—4 of the hood assembly in FIG. 1 in a closed position.
Figure 5:
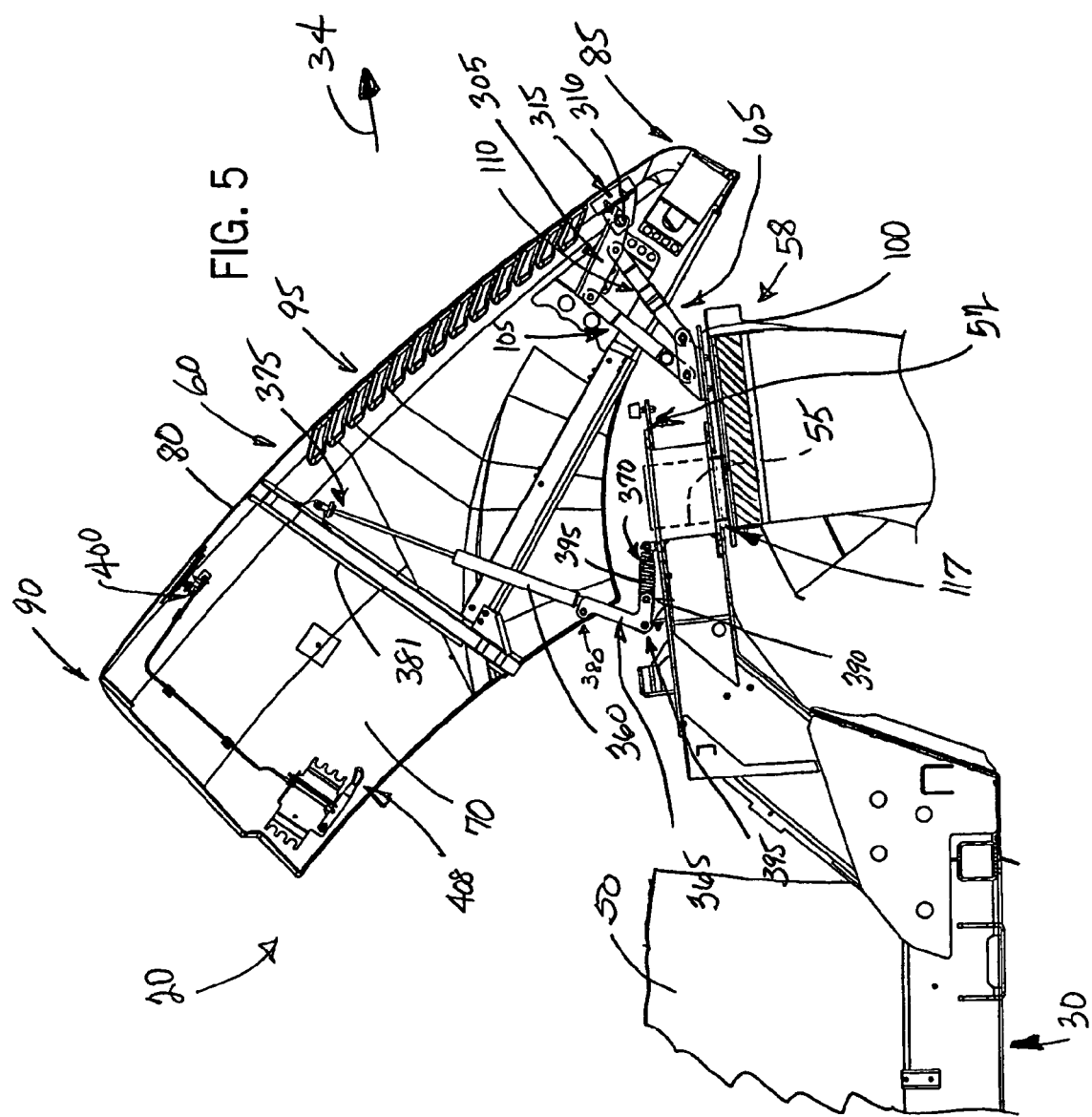
FIG. 5 illustrates a detailed cross-section of the hood assembly in FIG. 4 in an open position.

FIGS. 4 and 5 illustrate a detailed cross-sectional view of the hood assembly 20 of the present invention in a closed position (FIG. 4) and an open position (FIG. 5). FIGS. 4 and 5 illustrate that the forward end 52 of the frame assembly 30 includes a kingpin 55 (shown as a dashed line) mounted on a fork assembly 58. The combined kingpin 55 and fork assembly 58 are configured to mount the front wheel assembly 40 (See FIG. 1) to the frame assembly 30.

Referring to FIGS. 1, 4 and 5, the hood assembly 20 is configured to enclose the drive unit 50 of the floater 25. The hood assembly 20 generally includes a hood 60 mounted by a hood linkage assembly 65. The hood linkage assembly 65 couples the hood 60 to the frame assembly 30 in a manner such that the hood 60 is operable to move between the closed position (FIGS. 1 and 4) and the open position (FIG. 5). Referring specifically to FIGS. 1 and 4, the hood 60 is generally horizontally aligned and located between the cab 45 and the forward end 52 of the frame assembly 30 (See FIG. 1) and positioned above the drive unit 50 (See FIG. 4). In an open position (as illustrated in FIG. 5), the hood 60 is held by the linkage assembly 65 in a raised and a forward position relative to the frame assembly 30 in the forward direction of travel 34.

Referring back to FIG. 1, the preferred hood 60 includes a first hood sidewall 70 opposed to a second hood sidewall 75, and a upper portion 80 extending therebetween. The upper portion 80 includes a forward end 85 and a rearward end 90. In a closed position, the forward end 85 of the hood upper portion 80 is located adjacent to the forward end 52 of the frame assembly 30, and the rearward end 90 of the hood upper portion 80 is located adjacent to the cab 45. The hood upper portion 80 can further include a series of intake openings or louvers 95 of variable size and shape configured to ventilate air to the drive unit 50 (see FIGS. 4 and 5). In the closed position as shown in FIGS. 1 and 4, the forward end 85 of the upper portion 80 of the hood 60 is generally angled downward to prevent undesired debris from entering the drive unit 50. Referring still to FIGS. 1 and 4, the first and second hood sidewalls 70 and 75 each include an arcuate portion 92 that aesthetically enhances the appearance of the floater 25. The upper portion 80 of the hood 60 is also generally angled downward from the rearward end 90 toward the forward end 85 of the hood upper portion 80.

Figure 2:
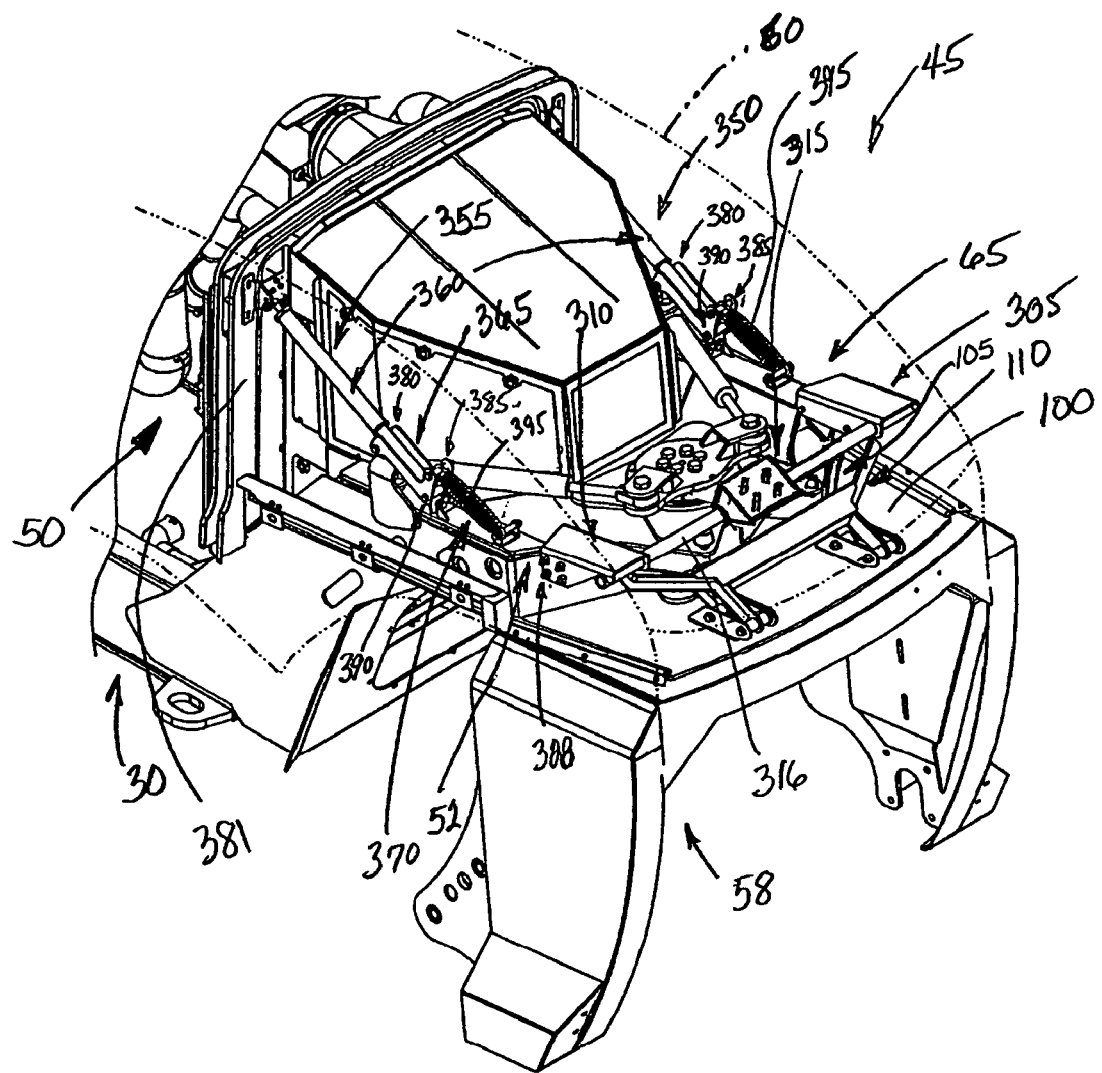
FIG. 2 illustrates a detailed isometric view of the hood assembly (hood shown in phantom) in accordance with the present invention.

Referring to FIGS. 2 and 4–5, the hood linkage assembly 65 couples the hood 60 to the frame assembly 30. As illustrated in FIGS. 2–5, the preferred linkage assembly 65 includes a platform 100 in support of a rearward linkage 105 and a forward linkage 110. The platform 100 is mounted at the forward end 52 of the frame assembly 30. Yet, as illustrated in FIGS. 2–5, the platform 100 can preferably extend forward beyond the forward end 52 of frame assembly 30. FIGS. 4 and 5 illustrate that the platform 100 can include an opening 117 configured to receive the kingpin 55 associated with the fork assembly 58.

Figure 3:
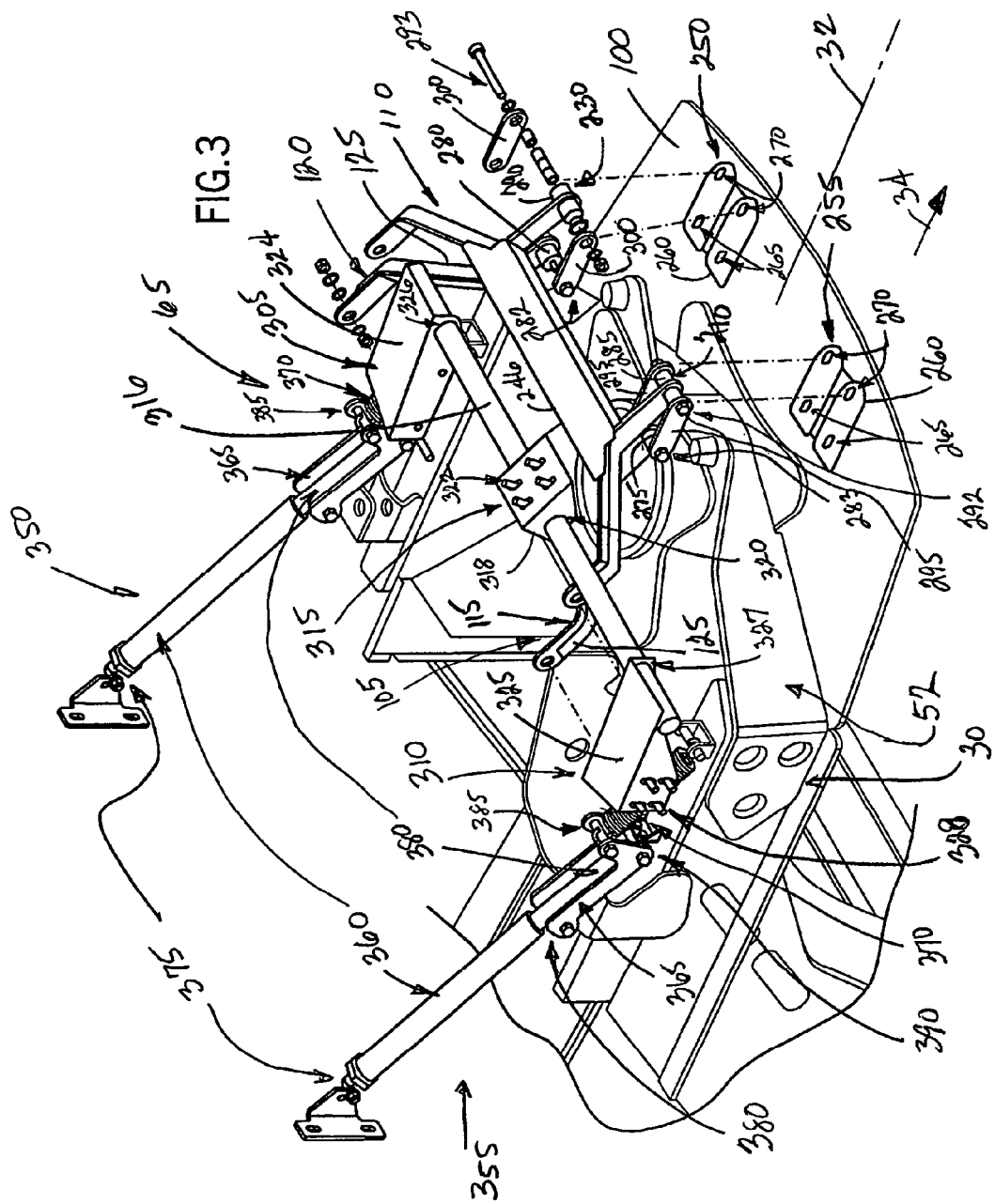
FIG. 3 illustrates a detailed isometric view of the hood assembly (excluding the hood) in FIG. 2.
Figure 6:
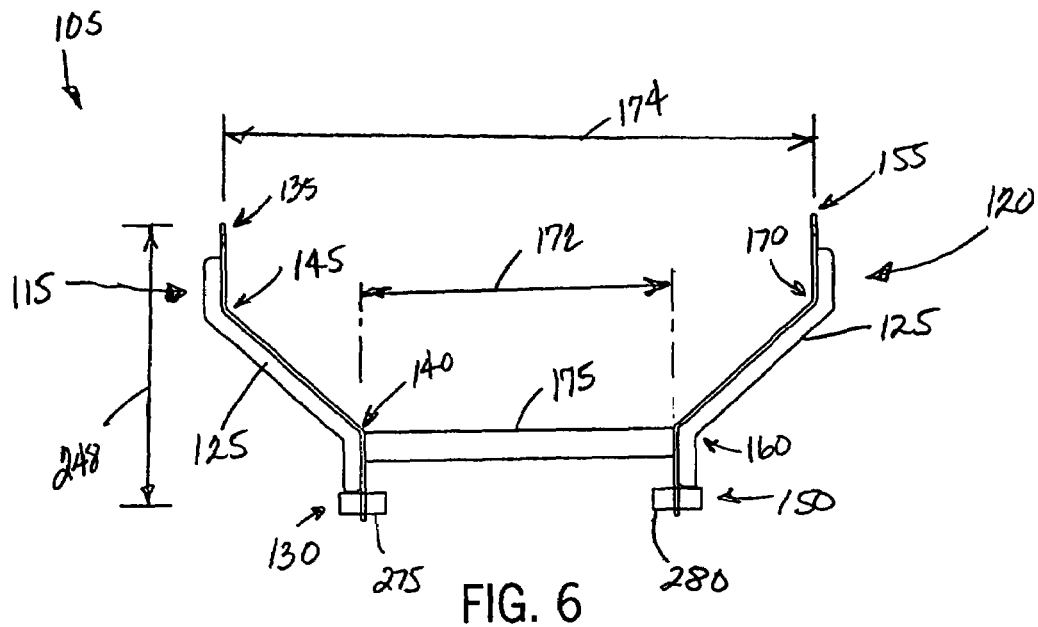
FIG. 6 illustrates a detailed front view of the rearward linkage of the hood linkage assembly shown in FIG. 3.

Referring specifically to FIG. 6, the preferred rearward linkage 105 includes a first lift arm 115 and a second lift arm 120. The preferred first and second lift arms 115 and 120 generally comprise non-parallel configured flat bars. As illustrated in FIG. 3, the first lift arm 115 is located on one side of the longitudinal axis 32 defined by the floater 25, and the second lift arm 120 is located on the other side of the longitudinal axis 32 opposite the first lift arm 115. Referring back to FIG. 6, the first and second lift arms 115 and 120 each further includes a gusset 125 extending generally tranverse relative to, and generally along the lengths of, the flat bars. The gusset 125 enhances the strength and stability of the rearward and forward linkages 105 and 110, respectively.

Still referring specifically to FIG. 6, the first lift arm 115 includes a lower free end 130 opposite an upper free end 135, and a first bend 140 and a second bend 145 located therebetween. In a similar manner, the second lift arm 120 includes a lower free end 150 and an upper free end 155, and a first bend 160 and a second bend 170 located therebetween in general symmetry relative to the location of the first and second bends 140 and 145, respectively, of the first lift arm 115. The lower free end 130 of the first lift arm 115 and the lower free end 150 of the second lift arm 120 are spaced a first width 172 apart. The upper free end 135 of the first lift arm 115 and the upper free end 155 of the second lift arm 120 are spaced a second width apart 174 that is greater relative to the first width 172 between the lower free ends 130 and 150, respectively.

FIG. 6 further illustrates a rearward linkage crossbar 175 that interconnects the lower first bends 140 and 160 of the first and second lift arms 115 and 120, respectively, of the rearward linkage 105. The rearward linkage crossbar 175 maintains the general alignment of the first lift arm 115 relative to the second lift arm 120, and thus enhances the stability of the hood assembly 20.

Figure 7:
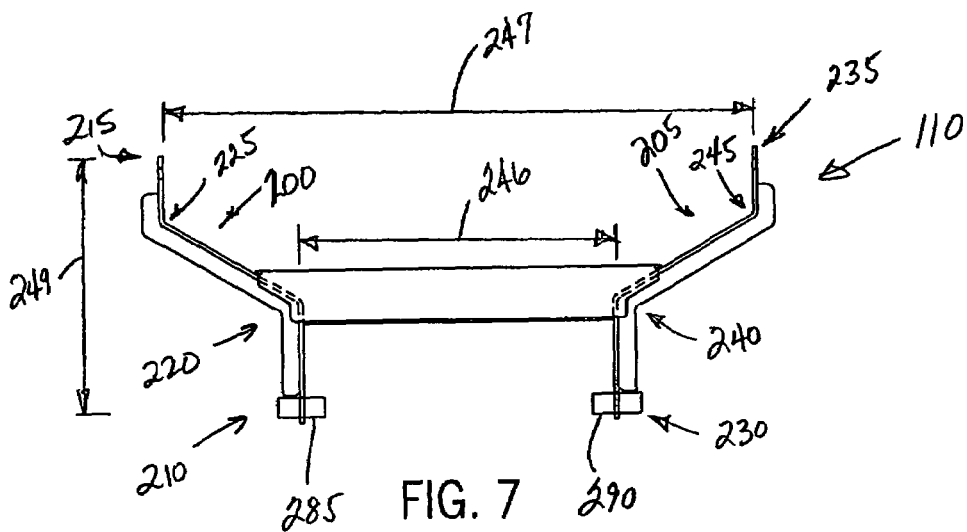
FIG. 7 illustrates a detailed front view of the forward linkage of the hood linkage assembly shown in FIG. 3.

Referring specifically to FIG. 7, the preferred forward linkage 110 includes a third lift arm 200 interconnected with a fourth lift arm 205, similar to the first and second lift arms 115 and 120 of the rearward linkage 105. The third lift arm 200 is located on one side of the longitudinal axis 32 (see FIG. 3) defined by the frame assembly 30. The fourth lift arm 205 is located on the other side of the longitudinal axis 32 (see FIG. 3) relative to the third lift arm 200. The third lift arm 200 includes a lower free end 210 and an upper free end 215, as well as a first bend 220 and a second bend 225 located therebetween. The fourth lift arm 205 includes a lower free end 230 and an upper free end 235, and a first bend 240 and a second bend 245 located therebetween. The lower free end 210 of the third lift arm 200 is spaced apart by a third width 246 from the lower free end 230 of the fourth lift arm 205, and the upper free end 215 of the third lift arm 200 is spaced apart from the upper free end 235 of the fourth lift arm 205 by a fourth width 247 that is larger relative to the third width 246 between the lower free ends 210 and 230 of the third and fourth lift arms 200 and 205, respectively.

Referring now to FIGS. 6 and 7, the first and second lift arms 115 and 120 of the rearward linkage 105 have a first length 248 (See FIG. 6), and the third and fourth lift arms 200 and 205 of the forward linkage 110 have a second length 249 (See FIG. 7) that is shorter relative to the first length 248 of the first and second lift arms 115 and 120 of the rearward linkage 105. This configuration of the rearward and forward linkages 105 and 110 enhances the smooth transition as the hood 60 moves forward from the closed position (see FIG. 4) toward the open position (see FIG. 5).

Referring specifically to FIG. 3, a series of platform mounting bracket assemblies 250 and 255 interconnect the rearward and forward linkages 105 and 110, respectively, to the platform 100. The first platform mounting bracket assembly 250 is located on one side of the longitudinal axis 32 defined by the frame assembly 30, and the second platform mounting bracket assembly 255 is located on the other side of the longitudinal axis 32 opposite the first platform mounting bracket assembly 250. The first and second platform mounting bracket assemblies 250 and 255 each includes a generally U-shaped platform bracket 260. The U-shaped platform bracket 260 includes a rearward opening 265 and a forward opening 270 located forward of the rearward opening 265 relative to the forward direction of travel 34 of the floater 25. The rearward and forward openings 265 and 270 are elongated to allow some adjustment of the hood 60 and linkage assembly 65 in a fore and aft direction relative to the forward direction of travel 34. Each platform bracket 260 can further include additional slots (not shown) that allow side-to-side adjustment of the hood 60 and linkage assembly 65 relative to the longitudinal axis 32 of the frame assembly 30. Referring to FIGS. 3, 6 and 7, a first pivot sleeve 275 located at the lower free end 130 of the first lift arm 115, and a second pivot sleeve 280 located at the lower free end 150 of the second lift arm 120 are configured to receive fasteners 282 and 283 coupling the rearward linkage 105 to the platform-mounting bracket assemblies 250 and 255 via openings 265. A third pivot sleeve 285 located at the lower free end 210 of the third lift arm 200, and a fourth pivot sleeve 290 located at the lower free end 230 of the fourth lift arm 205, are configured to receive fasteners 292 and 293, respectively, coupling the forward linkage 110 to the platform mounting bracket assemblies 250 and 255 at openings 270. The pivot sleeves 275, 280, 285, and 290 allow the rearward and forward linkages 105 and 110 to pivot about the first and second platform mounting bracket assemblies 250 and 255, respectively. A first pair of spacers 295 are pivotally coupled between the pivot sleeves 275 and 285 of the first and third lift arms 115 and 200, respectively. A second pair of spacers 300 are pivotally coupled between the pivot sleeves 280 and 290 of the second and fourth lift arms 120 and 205. The preferred pairs of spacers 295 and 300 generally include elongated flat bars. The spacers 295 and 300 hold the rearward and forward linkages 105 and 110, respectively, a predetermined distance apart to maintain consistent rotation of the hood 60 between the closed and open positions.

Referring now to FIGS. 2 and 3, a series of pivotal hood bracket assemblies that includes a first hood sidewall bracket assembly 305, a second hood sidewall bracket assembly 310, and a central hood bracket assembly 315. The pivotal hood bracket assemblies 305, 310, and 315 attach the first and second lift arms 115 and 120, respectively, of the rearward linkage 105, as well as the third and fourth lift arms 200 and 205, respectively, of the forward linkage 110, to the hood 60. More specifically, the central hood bracket assembly 315 is attached to the forward end 85 of the upper portion 80 of the hood 60 (See FIGS. 4 and 5) and centrally located between the first and second hood sidewall bracket assemblies 305 and 310. The first hood sidewall bracket assembly 305 preferably is attached to the first hood sidewall 70 (See FIG. 2). The second hood sidewall mounting bracket assembly 310 is attached to the second hood sidewall 75 (See FIG. 1).

Referring specifically to FIG. 3, a cross bar 316 interconnects the first and second sidewall bracket assemblies 305 and 310, respectively, with the central pivotal hood bracket assembly 315. The central pivotal hood bracket assembly 315 preferably includes a "U" shaped mounting bracket 318 having a series of openings 320 configured to receive the crossbar 316. Fasteners 322 couple the central pivotal hood bracket assembly 315 to the upper portion 80 of the hood 60 (See FIGS. 4 and 5). In a similar manner, the first and second sidewall bracket assemblies 305 and 310 include U-shaped mounting brackets 324 and 325, respectively. The U-shaped mounting brackets 324 and 325 include a openings 326 and 327, respectively, configured to receive the crossbar 316. Fasteners 328 couple the first and second sidewall bracket assemblies 305 and 310, respectively, to the first and second hood sidewalls 70 and 75 (See FIGS. 1 and 2), respectively.

Still referring to FIG. 3, the hood assembly 20 further includes a first assist device 350 and a second assist device 355. The first assist device 350 is located on one side of the longitudinal axis 32 defined by the frame assembly 30, and the second assist device 355 is located on the other side of the longitudinal axis 32 opposite the first assist device 350. Both the first and second assist devices 350 and 355 are mounted rearward of the rearward and forward linkages 105 and 110 relative to the forward direction of travel 34 of the floater 25. Each of the first and second assist devices 350 and 355 includes a lift cylinder 360, a lift assist bracket 365, and a pull device 370. The preferred lift cylinder 360 is a telescoping, compressed spring-cylinder having a first free end 375 and a second free end 380. The first free end 375 of the lift cylinder 360 is pivotally coupled to an interior support structure 381 located rearward of the louvers 95 of the hood 60 (See FIGS. 2, 4 and 5). The type (e.g., spring, hydraulic, pneumatic, etc.) of lift cylinder 360 can vary and is not limiting on the invention.

As illustrated in FIG. 3, the preferred lift assist bracket 365 is generally an "L" shaped bracket and includes a first free end 382, and a second free end 385, and a pivot elbow 390 located therebetween. The first free end 382 of the lift assist bracket 365 is coupled to the second free end 380 of the lift cylinder 360. The pivot elbow 390 of the lift assist bracket 365 is pivotally coupled to the floater frame assembly 30.

As illustrated in FIGS. 3–5, the preferred pull device 370 includes a spring interconnected between the second free end 385 of the lift assist bracket 365 and the frame assembly 30. The type of pull device 370 can vary and is not limiting on the invention.

In a preferred embodiment of the hood assembly 20 in the closed position as illustrated in FIG. 4, the lift cylinder 360 is disposed at an angle (θ) of approximately thirty degrees (plus or minus five degrees) relative to horizontal. At this angled position, the lift cylinder 360 applies at least a partial upward force and rearward force on the hood 60 that assists the operator in releasing the hood 60 from the closed position. The lift cylinder 360 in combination with the pull device 370 is also operable to assist in lifting the hood 60 upward and rotating the hood 60 forward toward the open position. A preferred assist device 350 and 355 is configured such that an operator standing on the ground can exert less than fifty pounds of force to raise and rotate the hood 60 forward to the open position and access the drive unit 50.

Referring now to FIGS. 4 and 5, the hood 60 is secured in the closed position (FIG. 4) by a latch mechanism 400. The preferred latch mechanism 400 is disposed toward the rearward end 90 of the hood 60 and centrally between the first and second hood sidewalls 70 and 75 of the hood 60. Although a single latch mechanism 400 is shown, the number and type of latch mechanism 400 can vary. A pull cord 405 extends from the latch mechanism 400 to a lever 408 located at one of the first and second hood sidewalls 70 and 75 of the hood 60. The pull cord 405 is configured such that an operator can pull the cord 405 via the lever 408 and thereby release the latch mechanism 400 and the hood 60 to move toward the open position (FIG. 5).

In operation, the hood assembly 20 is secured by the latch mechanism 400 in the closed position, as shown in FIG. 4. Upon pulling the pull cord 405 via lever 408, the latch mechanism 400 releases the hood 60. Upon release of the latch mechanism 400, the assist device 350, 355 on each side of the hood 60 applies a rearward and an upward force to the hood 60 that causes the hood 60 to pivot upward from the closed position. The assist device 350, 355 in combination with the forward and rearward linkages 105 and 110 aid in rotating the hood 60 upward and forward. The linkage assembly 65 rotates the hood 60 in an upward direction and a forward direction such that the hood 60 clears the cab 45. The linkage assembly 65 continues to move the hood 60 in a forward direction toward the open position and clears the forward end 52 of the floater frame assembly 30 as well as the fork assembly 58. The three pivotal hood bracket assemblies 305, 310, and 315 enhance the stability of the hood assembly 20 in both fore and aft movement of the hood by preventing side-to-side parallelogramming of the hood 60. Moreover, the pivotal bracket assemblies 305, 310, and 315 aid in preventing the hood from twisting (e.g., caused by wind, etc.) in the open position. The first and second assist devices 350 and 355, in combination with the hood linkage assembly 65 assist rotation of the hood 60 towards the open position. In the open position as shown in FIG. 5, the hood 60 generally extends in vertical alignment at an extended positioned just beyond the forward end 52 of the frame assembly 30. The extended forward position of the hood 60 provides the operator with greater access to the various routine service points of the drive unit 50 and thus enhances the ease in maintaining the drive unit 50 in a good operational manner.

Many changes and modifications could be made to the invention without departing from the spirit thereof. The scope of these changes will become apparent from the appended claims.

We claim:

1. A hood linkage assembly coupling a hood to a frame assembly of a vehicle, the frame assembly having a forward end relative to a forward direction of travel of the vehicle, the forward end of the frame assembly including at least one kingpin in combination with a front wheel assembly, the frame assembly in support of a cab and a drive unit mounted between the cab and the forward end of the frame assembly, the hood in a closed position located between the cab and the forward end of the frame assembly of the vehicle and above the drive unit, the hood including a first sidewall, a second sidewall opposite the first sidewall, and an upper portion extending therebetween, the upper portion of the hood having a forward end and a rearward end relative to the forward direction of travel of the vehicle, the hood linkage assembly comprising:

a first pivotal hood coupling assembly and a second pivotal hood coupling assembly, the first pivotal hood coupling assembly attached to the first hood sidewall and the second pivotal hood coupling assembly attached to the second hood sidewall;

a third pivotal hood coupling assembly attached at the forward end of the upper portion of the hood, the third pivotal hood coupling located generally central between the first and the second pivotal hood coupling assemblies; and a cross bar interconnecting the first and second pivotal hood coupling assemblies with the third pivotal hood coupling assembly.

2. The hood linkage assembly as recited in claim 1, further comprising:

a platform mounted on the forward end of the vehicle frame, the platform having an opening to receive the kingpin; and a first platform mounting bracket assembly and a second platform mounting bracket assembly mounted to the platform.

3. The hood linkage assembly as recited in claim 1, further comprising:

a first assist device and a second assist device, the first and second assist devices connected between the frame assembly and the hood, the first and second assist devices each configured to exert a force to assist the operator in moving the hood from the closed position toward an open position, wherein the first and second assist devices are mounted to each side of the frame assembly at the rearward end of the hood adjacent to the cab.

4. The hood linkage assembly as recited in claim 3, further comprising:
an internal support structure located along an underside of the hood, the internal support structure extending from the first-sidewall to the second-sidewall of the hood, wherein the first and second assist devices are interconnected between the internal support structure and the frame assembly.

5. The hood linkage assembly as recited in claim 2, further comprising:
a rearward linkage that includes a first lift arm and a second lift arm, the first lift arm located on one side of a central longitudinal axis defined by the frame assembly of the vehicle and the second lift arm located on the other side of the central longitudinal axis opposite the first lift arm, the first and second lift arms each having a first free end opposite a second free end, wherein the first free end of the first lift arm is spaced a first width apart from the first free end of the second lift arm, and wherein the second free end of the first lift arm is spaced a second width apart from the second free end of the second lift arm, wherein the second width between the second free ends is greater relative to the first width between the first free ends of the first and second lift arms, and wherein the first free ends of the first and second lift arms are pivotally coupled to the first and second platform mounting bracket assemblies.

6. The hood linkage assembly as recited in claim 5, wherein the first lift arm includes a first bend and a second bend disposed between the first and second free ends of the first lift arm, and wherein the second lift arm includes a first bend and a second bend disposed between the first and second free ends of the second lift arm, the first and second bends of the first lift arm located generally symmetrical relative the first and second bends of the second lift arm.

7. The hood linkage assembly as recited in claim 6, wherein the rearward linkage further comprises a crossbeam interconnecting the first bend of the first lift arm and the first bend of the second lift arm.

8. The hood linkage assembly as recited in claim 6, further comprising:
a forward linkage located forward of the rearward linkage relative to the forward direction of the travel of the vehicle, the forward linkage comprising a third lift arm and a fourth lift arm, the third lift arm located on one side of the longitudinal axis defined by the vehicle and the fourth lift arm located on the other side of the longitudinal axis, the third and fourth lift arms each having a first free end opposite a second free end, wherein the first free end of the third lift arm is spaced a third width apart from the first free end of the fourth lift arm, and wherein the second free end of the third lift arm is spaced a fourth width apart from the second free end of the fourth lift arm, and wherein the fourth width between the second free ends is larger relative to the third width between the first free ends.

9. The hood linkage assembly as recited in claim 8, wherein the first and second free ends of the first and second lift arms, respectively, are spaced a first vertical height apart, and wherein the first and second free ends of the third and fourth lift arms, respectively, are spaced a second vertical height apart that is less than the first vertical height of the first and second lift arms.

10. The hood linkage assembly as recited in claim 1, wherein the first and second assist devices each comprises:
a lift cylinder having a first free end and a second free end, the first free end pivotally coupled to one of the first and second hood sidewalls, the lift cylinder operable to apply a lift force to the hood;
a pivot bracket, the pivot bracket having an L-shape and including a first free end and a second free end and a pivot elbow located therebetween, the first free end of the pivot bracket coupled the second free end of the lift assembly, and the pivot elbow pivotally coupled to the vehicle frame; and
a pull device connected between the second free end of the pivot bracket and the frame of the vehicle,
wherein the lift cylinder is positioned at a first angle relative to horizontal when the hood is in the closed position such that the lift cylinder applies at least a portion of the lift force in a rearward direction toward the cab relative to the forward direction of travel of the vehicle,
wherein the lift cylinder exerts a radially outward force relative to the pivot elbow of the pivot bracket and rotates about its second free end at the pivot elbow as the hood moves between the closed position and the open position, and
wherein the pull device applies a rotational torque force about the pivot elbow of the pivot bracket to the hood, the rotational torque force of the pull device about the pivot bracket applied in a forward direction relative to the forward direction of travel of the vehicle so as to assist movement of the hood from the closed position toward the hood's open position at the forward end of the vehicle frame.

11. The hood linkage assembly as recited in claim 1, further comprising:
a latch assembly configured to releaseably attach the hood in the closed position with the vehicle frame assembly, the latch assembly including:
a latch mechanism centrally disposed at the rearward end of the hood, and
a pull cord extending from the latch mechanism to a pull cord opening at one of the first and second hood sidewalls, the pull cord configured such that pulling the pull cord releases the hood from the latch mechanism.

12. An agricultural applicator comprising:
a frame assembly mounted on a series of wheel assemblies, the frame assembly including a forward end relative to a forward direction of travel of the agricultural applicator, the frame assembly defining a central longitudinal axis in the forward direction of travel;
a cab mounted on the frame assembly;
a drive unit mounted on the frame assembly, the drive unit located between the cab and the forward end of the frame assembly;
a hood assembly mounted to the frame assembly, the hood assembly comprising:
a hood in a closed position located between the cab and the forward end of the frame assembly and above the drive unit, the hood in an open position generally vertically extending and located adjacent to the forward end of the frame assembly, the hood comprising:
a first hood sidewall,
a second hood sidewall opposite the first hood sidewall, and
an upper portion extending therebetween, the upper portion of the hood having a forward end and a rearward end relative to the forward direction of travel of the agricultural applicator; and
a linkage assembly coupling the hood to the frame assembly, the linkage assembly located at the forward end of the frame assembly, the linkage assembly comprising:
a first assist device and a second assist device, the first assist device connected between the frame assembly and the first hood sidewall, the second assist device connected between the frame assembly and the second hood sidewall, the first and second assist devices each configured to exert a force to assist the operator in moving the hood from the closed position toward an open position;

a first rotatable coupling assembly and a second rotatable coupling assembly, the first rotatable coupling attached to the first hood sidewall and the second rotatable coupling assembly attached to the second hood sidewall;

a third rotatable coupling assembly attached to the forward end of the upper portion of the hood, the third rotatable coupling assembly generally centrally located between the first and the second rotatable coupling assemblies; and a cross bar interconnecting the third rotatable coupling assembly with the first and second rotatable coupling assemblies.

13. The agricultural applicator as recited in claim 12, wherein the linkage assembly further comprises:
a platform mounted at the forward end of the frame assembly; and
a first and a second platform mounting bracket assembly each coupling the linkage assembly to the platform.

14. The agricultural applicator as recited in claim 12, wherein the linkage assembly further comprises:
a rearward linkage coupled to the first and second rotatable couplings, the rearward linkage including a first lift arm and a second lift arm located on either side of the central longitudinal axis define by the frame assembly, the first and second lift arms each having a first free end opposed to a second free end, the first free ends of the first and second lift arms spaced a first width apart, and the second free ends of the first and second lift arms spaced a second width apart, the second width being greater relative to the first width between the first free ends.

15. The agricultural applicator as recited in claim 14, wherein the first lift arm includes a first bend and a second bend located between the first and second free ends of the first lift arm, and wherein the second lift arm includes a first bend and a second bend located between the first and second free ends of the second lift arm, the first and second bends of the first lift arm located generally symmetrical relative the first and second bends of the second lift arm.

16. The agricultural applicator as recited in claim 15, wherein the rearward linkage further comprises:
a crossbeam interconnecting the first bends of the first and second lift arms, wherein the first bends of the first and second lift arms are located lower relative to the second bends of the first and second lift arms.

17. The agricultural applicator as recited in claim 16, wherein the linkage assembly further comprises:
a forward linkage mounted forward of the rearward linkage relative to the forward direction of travel of the agricultural applicator, the forward linkage pivotally coupled between the platform and the first and second rotatable couplings, the forward linkage including a third lift arm and a fourth lift arm, the third lift arm located on one side of the central longitudinal axis defined by the frame assembly, and the fourth lift arm located on the other side of the central longitudinal axis defined by the frame assembly opposite the third lift arm, the third and fourth lift arms each having a first free end opposite a second free end, wherein the first free end of the third lift arm is spaced a third width apart from the first free end of the fourth lift arm, and wherein the second free end of the third lift arm is spaced a fourth width apart from the second free end of the fourth lift arm, and wherein the fourth width between the second free ends is larger relative to the third width between the first free ends.

18. The agricultural applicator as recited in claim 17, wherein the first and second lift arms of the rearward linkage are spaced apart a first vertical height, and wherein the first and second free ends of the third and fourth lift arms of the forward linkage are spaced apart a second vertical height that is less than the first vertical height of the first and second lift arms of the rearward linkage.

19. The agricultural applicator as recited in claim 12, wherein the first and second assist devices each comprises:
a lift cylinder having a first free end and a second free end, the first free end pivotally coupled to one of the first and second hood sidewalls, the lift cylinder operable to apply a lift force on the hood;
a pivot bracket, the pivot bracket having an L-shape and including a first free end and a second free end and a pivot elbow located therebetween, the first free end of the pivot bracket coupled the second free end of the lift assembly, and the pivot elbow pivotally coupled to the frame assembly; and
a pull device connected between the second free end of the pivot bracket and the frame assembly,
wherein the lift cylinder is positioned at a first angle relative to horizontal when the hood is in the closed position such that the lift cylinder applies at least a portion of the lift force in a rearward direction toward the cab relative to the forward direction of travel of the agricultural applicator,
wherein the lift cylinder rotates about its second free end at the pivot elbow as the hood moves from the closed position toward the open position, and
wherein the pull device applies a rotational torque force about the pivot elbow of the pivot bracket to the hood, the rotational torque force of the pull device about the pivot bracket applied in a forward direction relative to the forward direction of travel of the agricultural applicator so as to assist movement of the hood from the closed position toward the hood's open position at the forward end of the frame assembly.

20. The agricultural applicator as recited in claim 12, further comprising:
a latch assembly configured to releasably couple the hood in the closed position with the frame assembly, the latch assembly including:
a latch mechanism centrally located at the rearward end of the hood; and
a pull cord extending from the latch mechanism to a pull cord opening at one of the first and second hood sidewalls, the pull cord configured such that pulling the pull cord releases the hood from the latch mechanism.

* * * * *